(12) United States Patent
Katar et al.

(10) Patent No.: US 8,614,961 B1
(45) Date of Patent: Dec. 24, 2013

(54) EFFICIENT COMMUNICATION OVER A SHARED MEDIUM

(75) Inventors: Srinivas Katar, Gainesville, FL (US); Lawrence W. Yonge, III, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 12/645,561

(22) Filed: Dec. 23, 2009

Related U.S. Application Data

(60) Provisional application No. 61/141,978, filed on Dec. 31, 2008.

(51) Int. Cl.
*H04L 12/28* (2006.01)

(52) U.S. Cl.
USPC .......................................... 370/252; 370/392

(58) Field of Classification Search
USPC .................... 370/252, 254, 328, 338, 345
See application file for complete search history.

(56) References Cited

U.S. PATENT DOCUMENTS

| | | | |
|---|---|---|---|
| 6,278,685 B1 * | 8/2001 | Yonge et al. | 370/203 |
| 6,996,131 B1 * | 2/2006 | Islam et al. | 370/514 |
| 7,447,232 B2 * | 11/2008 | Stephens et al. | 370/471 |
| 7,746,907 B2 * | 6/2010 | Denton | 370/539 |
| 7,881,411 B2 * | 2/2011 | Sutton | 375/345 |
| 2005/0041669 A1 * | 2/2005 | Cansever et al. | 370/395.21 |

* cited by examiner

*Primary Examiner* — Yemane Mesfin
*Assistant Examiner* — Mon Cheri Davenport
(74) *Attorney, Agent, or Firm* — DeLizio Gilliam, PLLC

(57) ABSTRACT

In one aspect, in general, the present application features a method for communicating among stations in a network. The method includes modulating a payload to be included in a transmission over the network. In some implementations, the transmission is transmitted by a transmitting station and received by one or more receiving stations. The method further includes determining overhead information to be included in the transmission and determining whether at least some of the overhead information is intended for stations other than the one or more receiving stations. In some implementations, the overhead information is associated with encoding or modulation of information in the payload or with a communication protocol used by the stations in the network. The method also includes modulating the overhead information based on whether at least some of the overhead information is intended for stations other than the one or more receiving stations.

42 Claims, 4 Drawing Sheets

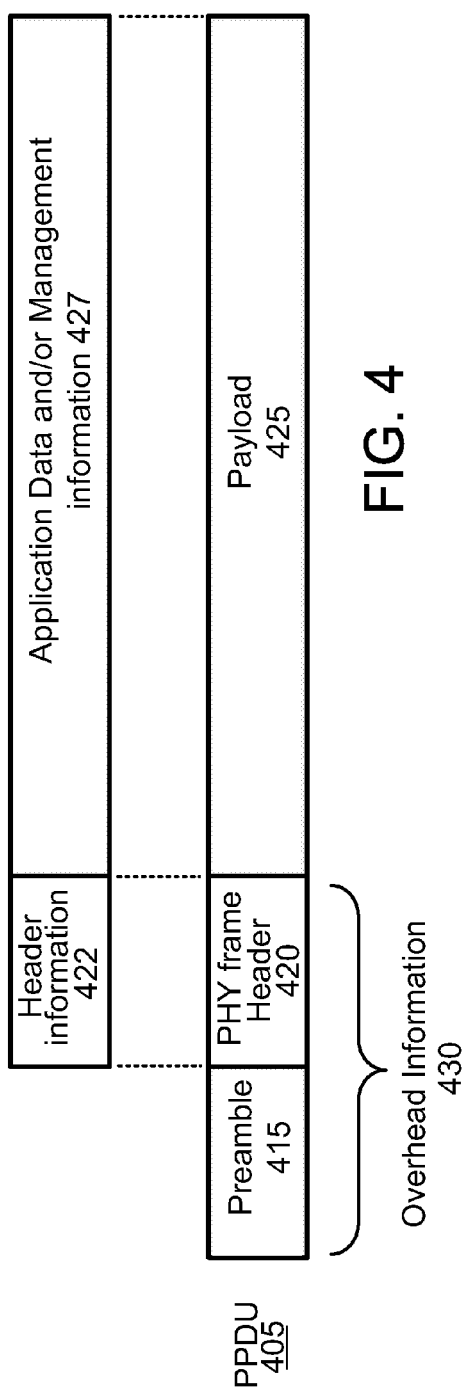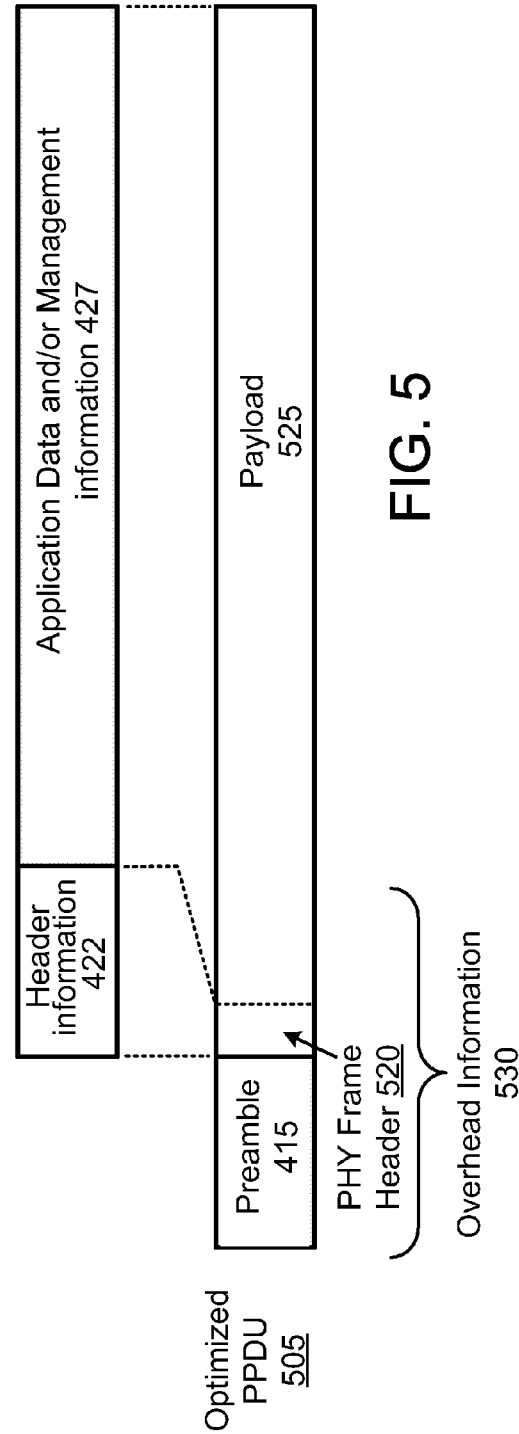

EFFICIENT COMMUNICATION OVER A SHARED MEDIUM

CROSS REFERENCE TO RELATED APPLICATION

This application claims the benefit of U.S. Provisional Application Ser. No. 61/141,978, filed on Dec. 31, 2008, the entire content of which is incorporated herein by reference.

TECHNICAL FIELD

This description relates to stations connected in a network communicating with each other. In particular, this description is directed to efficient communication over a shared medium.

BACKGROUND

Home networking systems commonly use phone lines, power lines or coaxial cables as a communication medium. In some cases, there could be variation in signal attenuation and noise characteristics between various pairs of nodes (also called stations, or devices). In such cases, home networking systems may use channel adaptation procedures that enable selection of unique physical layer encoding and/or modulation parameters (e.g., modulation rate and forward error correction code rate) between a given pair of nodes. This approach enables optimization of the physical data rate that can be achieved between the pair of nodes according to current channel characteristics.

One of the attributes of home networking systems is the Physical Layer Protocol Data Unit (PPDU) format. A PPDU is a physical layer signal that is transmitted on the medium. A PPDU may include several parts or fields such as a preamble, a header and a payload.

Some systems transmit the header in a broadcast mode in which the physical layer encoding and/or modulation is done such that even the furthest station in the network is capable of receiving (i.e., successfully demodulating and decoding) the header.

SUMMARY

In one aspect, in general, a method for communicating among stations in a network includes: modulating a payload to be included in a transmission over the network transmitted by a transmitting station and received by one or more receiving stations; determining overhead information to be included in the transmission, the overhead information being associated with encoding or modulation of information in the payload or with a communication protocol used by the stations in the network; determining whether at least some of the overhead information is intended for stations other than the one or more receiving stations; and modulating the overhead information based on whether at least some of the overhead information is intended for stations other than the one or more receiving stations.

Aspects can include one or more of the following features.

Modulating the payload includes modulating the payload according to at least one estimated characteristic of a communication channel between the transmitting station and at least one of the receiving stations.

Modulating the overhead information includes modulating the overhead information according to at least one common characteristic of communication channels between the transmitting station and each of the one or more receiving stations.

Determining at least one common characteristic of communication channels between the transmitting station and each of the one or more receiving stations.

The overhead information is received by at least one station that does not receive the payload.

The at least one station that does not receive the payload includes a station that manages a plurality of stations on the network.

Modulating the overhead information includes modulating the overhead information according to at least one common characteristic of communication channels between the transmitting station and each of the one or more receiving stations and the at least one station that does not receive the payload.

Modulating the overhead information includes: modulating the overhead information according to at least one estimated characteristic of the communication channel if none of the overhead information is intended for stations other than the one or more receiving stations, and modulating the overhead information for broadcast to stations other than the one or more receiving stations if at least some of the overhead information is intended for stations other than the one or more receiving stations.

Modulating the overhead information for broadcast to stations other than the one or more receiving stations includes appending a header including the overhead information to the payload within a physical protocol data unit, where at least a part of the header and the payload are modulated according to different transmission parameters.

Modulating the overhead information according to at least one estimated characteristic of the communication channel includes modulating at least a part of the overhead information and the payload according to the estimated characteristic of the communication channel using the same transmission parameters.

At least one estimated characteristic of the communication channel used to modulate the payload is different from another estimated characteristic of the communication channel used to modulate the overhead information.

A modulation parameter based on the at least one estimated characteristic of the communication channel used to modulate the payload is less conservative than another modulation parameter based on the another estimated characteristic of the communication channel used to modulate the overhead information.

The overhead information comprises information on one or more of a modulation technique, a modulation rate, duration of one or more parts of the transmission and an error correction method.

The overhead information comprises status update information about a station in the network.

Transmitting a preamble field of the physical protocol data unit.

Receiving the transmission by the one or more receiving stations and transmitting, by at least one of the one or more receiving stations, one or more portions of the transmission modulated according to at least one estimated characteristic of a communication channel between another station and at least one of one or more receiving stations.

Negotiating one or more transmission parameters between the transmitting station and the one or more receiving stations before the transmission is transmitted.

The transmission parameters are based on at least one estimated characteristic of a communication channel between the transmitting station and at least one of the receiving stations.

In another aspect, in general, a system for communicating among stations in a network includes: a transmitting station, in communication with one or more receiving stations, configured to determine overhead information to be included in a transmission, determine whether at least some of the overhead information is intended for stations other than the one or more receiving stations, modulate a payload to be included in the transmission and modulate the overhead information based on the whether the overhead information is intended for stations other than the one or more receiving stations; and a receiving station, of the one or more receiving stations, configured to receive the transmission from the transmitting station.

Aspects can include one or more of the following features.

The overhead information is associated with encoding or modulation of information in the payload or with a communication protocol used by the stations in the network.

The transmitting station is configured to modulate the payload according to at least one estimated characteristic of a communication channel between the transmitting station and at least one of the receiving stations.

The transmitting station is configured to modulate the overhead information according to at least one estimated characteristic of the communication channel if none of the overhead information is intended for stations other than the one or more receiving stations.

The transmitting station is further configured to modulate the overhead information for broadcast to stations other than the one or more receiving stations if at least some of the overhead information is intended for stations other than the one or more receiving stations.

The transmitting station is further configured to append a header comprising the overhead information to the payload within a physical protocol data unit, where at least a part of the header and the payload are modulated according to different transmission parameters.

The transmitting station is further configured to modulate at least a part of the overhead information and the payload according to the estimated characteristic of the communication channel using the same transmission parameters.

The overhead information includes information on one or more of a modulation technique, a modulation rate, duration of one or more parts of the transmission and an error correction method.

The overhead information includes status update information about a station in the network.

The transmitting station is further configured to transmit a preamble field of the physical protocol data unit.

The receiving station is configured to receive the transmission and transmit one or more portions of the transmission modulated according to at least one estimated characteristic of a communication channel between another station and the receiving station.

The transmitting station is configured to modulate the overhead information according to at least one common characteristic of communication channels between the transmitting station and each of the one or more receiving stations.

The transmitting station is configured to determine at least one common characteristic of communication channels between the transmitting station and each of the one or more receiving stations.

The overhead information is received by at least one station that does not receive the payload.

The at least one station that does not receive the payload includes a station that manages a plurality of stations on the network.

The transmitting station is configured to modulate the overhead information according to at least one common characteristic of communication channels between the transmitting station and each of the one or more receiving stations and the at least one station that does not receive the payload.

The at least one estimated characteristic of the communication channel used to modulate the payload is different from another estimated characteristic of the communication channel used to modulate the overhead information.

The transmitting station is configured to negotiate one or more transmission parameters between the transmitting station and the one or more receiving stations before the transmission is transmitted.

The transmission parameters are based on at least one estimated characteristic of a communication channel between the transmitting station and at least one of the one or more receiving stations.

A modulation parameter based on the at least one estimated characteristic of the communication channel used to modulate the payload is less conservative than another modulation parameter based on the another estimated characteristic of the communication channel used to modulate the overhead information.

In still another aspect, in general, a method of transmitting data packets from a transmitting station to a receiving station, the data packet including overhead information and payload, includes: transmitting at least a first portion of the overhead information in accordance with at least a first set of transmission parameters; and transmitting a second portion of the overhead information in accordance with at least a second set of transmission parameters different from the first set of transmission parameters, wherein at least one of the first set of transmission parameters and the second set of transmission parameters are determined using one or more previous transmissions between the transmitting station and the receiving station.

Aspects can include one or more of the following features.

At least one of the first set of transmission parameters and the second set of transmission parameters are negotiated between the transmitting station and the receiving station in accordance with one or more estimated characteristics of a communication channel between the transmitting station and the receiving station.

Transmitting the payload in accordance with a third set of transmission parameters negotiated between the transmitting station and the receiving station in accordance with the one or more estimated characteristics of the communication channel between the transmitting station and the receiving station.

At least one parameter in the first set of transmission parameters or the second set of transmission parameters is substantially same as a parameter in the third set of transmission parameters.

Transmitting at least a portion of the data packet in a broadcast mode.

Among the many advantages of the invention (some of which may be achieved only in some of its various aspects and implementations) are the following:

The time required for transmitting overhead information can be reduced. This improves the efficiency of the transmission. The amount of overhead information transmitted can be reduced, thus enabling further improvement in the efficiency of the transmission. The reliability of the overhead transmission can be enhanced by modulating it based on characteristics of a communication channel between the transmitter and the receiver.

The methods and systems described herein reduces complexity of the receiver as the overhead information is modulated using modulation parameters based on characteristics of the communication channel. The modulation parameters for both the overhead and payload may be negotiated prior to the transmission. When overhead information is transmitted in broadcast mode, the receiver may need to process the overhead information in real-time in order to determine the modulation parameters for the payload. Therefore in some implementations, such as in high data rate systems, it is advantageous to prenegotiate the modulation parameters in order to reduce receiver complexity.

Other aspects and advantages will be apparent from the detailed description, drawings, appendices and claims.

DESCRIPTION OF DRAWINGS

FIG. 4 is a block diagram of a physical protocol data unit (PPDU); and

FIG. 5 is a block diagram of an optimized PPDU.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
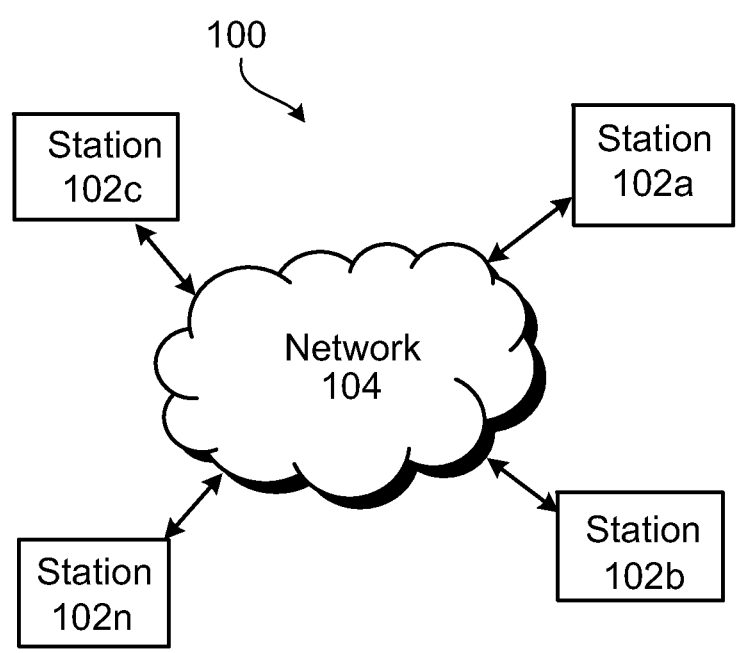
FIG. 1 is a schematic diagram of a communication network.

FIG. 1 shows a system 100 of an exemplary network configuration for a plurality of stations communicating with each other. In broad overview, the system 100 includes a plurality of stations 102a-102n communicating with each other over a network 104. The network 104 may include one or more different types of network. For example, the network 104 may include a local area network (LAN), such as a company intranet or a home network. In some implementations, the network 104 may include a metropolitan area network (MAN) or a wide area network (WAN) such as the Internet. In other implementations, the network 104 may include a combination of one or more different types of network. For example, a LAN such as the home network may be connected to an external access network. In such cases, one or more gateway devices may act as interfaces between two different networks.

In some implementations, the network 104 comprises one or more network devices connected to a shared medium such as a phone line network or a coaxial cable network. The one or more network devices may be connected via one or more gateway devices to an external network such as the internet. The gateway device may be connected by any type and form of connection to the external network including a broadband connection or a dialup connection. The gateway device may be connected via one or more bridges to other home network segments. The home network segments may be based on a home networking technology such as one based on power line networks.

The network 104 can be of any type and form and may include any of the following: a point to point network, a broadcast network, a computer network, a power line network, an Asynchronous Transfer Mode (ATM) network, a Synchronous Optical Network (SONET), a Synchronous Digital Hierarchy (SDH) network, a wireless network and a wired network. If the network 104 is at least in part a wired network, the network 104 may include one or more of the following: coaxial cable, telephone wires, power line wires, twisted pair wires or any other form and type of wire. The topology of the network 104 may be a bus, star or a ring topology or any other topology capable of supporting the operations described herein.

In some implementations, the network 104 may be a Broadband Power Line Network (BPLN) that provides access to a backhaul network. A BPLN can be managed by a service provider entity having access to the underlying physical power line medium. A BPLN is a general purpose network that can be used for several types of applications including, smart grid management, broadband internet access, voice and video delivery services, etc. In various implementations, a BPLN can be deployed on low voltage, medium voltage and high voltage power lines. Additionally, a BPLN can span an entire neighborhood or it may be deployed within a single multi-dwelling unit. For example, it can be used to provide network service to tenants in a single apartment building. While power lines are one medium for deploying the BPLN, similar techniques can be deployed on other wire lines, such as, for example, coaxial cables, twisted pair or a combination thereof.

In general, the system 100 includes a plurality of stations 102a-102n (102 in general). In some implementations, the stations 102 may be stations in a BPLN that can share certain functionality such as a common security protocol. In some implementations, the stations 102 may include a Head End (HE), Repeaters (R), and Network Termination Units (NTUs). In other implementations, various types of Customer Premises Equipment (CPE) stations (e.g., a computer) can be used as endpoint nodes in the network. Such stations may communicate with other nodes in the network through one or more of the NTU, any number of repeaters, (e.g., including no repeaters), and the Head End.

In some implementations, the stations 102 may be nodes of a home network (HN) communicating with each other using a home networking technology. The stations 102 may communicate with each other using any of a variety of communication protocols. In one implementation, each node in the network may communicate as a communication "station" using a PHY layer protocol that is used by the nodes to send transmissions to any other stations that are close enough to successfully receive the transmissions. Stations that cannot directly communicate with each other may use one or more repeater stations to communicate with each other. In some implementations, one of the stations 102a may act as a master node or station that controls, at least in some way, the other stations 102. In other implementations, there may be more than one master node in a network 104. In such cases, the more than one master nodes may share responsibilities or work in cooperation with each other. In some implementations, the master node(s) 102a may need to receive overhead information transmitted by any other station 102 in the network 104. Examples of techniques for managing communication using a master node can be found in co-pending U.S. Provisional Application No. 61/141,984, filed on Dec. 31, 2008, entitled "DYNAMIC MANAGEMENT OF SHARED TRANSMISSION OPPORTUNITIES," incorporated herein by reference.

In some implementations, the stations 102 communicate with each other using data units. In some of these implementations, the data units may be transmitted over phone wire media, power line cables or coaxial cables, for example, using a physical layer protocol as a Physical Layer Protocol Data Unit (PPDU). The data units may include a payload part with information to be delivered to a station and may include overhead information. The payload part may include, for example, application data and/or management information, (e.g., in some cases, in the form of a packet of a higher layer protocol). The overhead information may include information associated with encoding or modulation of information in the payload or with a communication protocol used by the stations in the network. The overhead information may include, for example, a preamble used to detect the start of the data unit, a header (also called a frame control field) after the preamble and before the payload, and a trailing check sequence after the payload used to check the integrity of the transmission. As described in more detail below, in some cases, some or all of the overhead information can be included as part of the payload according to a given scheme for modulating the payload.

Any of a variety of communication system architectures can be used to implement the portion of the network interface module that converts data to and from a signal waveform that is transmitted over the communication medium. An application running on a station provides and receives data to and from the network interface module in segments. A "MAC Service Data Unit" (MSDU) is a segment of information received by the MAC layer. The MAC layer can process the received MSDUs and prepares them to generate "MAC protocol data units" (MPDUs). An MPDU is a segment of information including a header (e.g., with management and overhead information) and payload fields that the MAC layer has asked the PHY layer to transport. An MPDU can have any of a variety of formats based on the type of data being transmitted. A "PHY Protocol Data Unit (PPDU)" refers to the modulated signal waveform representing an MPDU that is transmitted over the power line by the physical layer.

Apart from generating MPDUs from MSDUs, the MAC layer can provide several functions including channel access control, providing the required QoS for the MSDUs, retransmission of corrupt information, routing and repeating. Channel access control enables stations to share the power line medium. Several types of channel access control mechanisms like carrier sense multiple access with collision avoidance (CSMA/CA), centralized Time Division Multiple Access (TDMA), distributed TDMA, token based channel access, etc., can be used by the MAC. Similarly, a variety of retransmission mechanism can also be used. The Physical layer (PHY) can also use a variety of techniques to enable reliable and efficient transmission over the transmission medium (power line, coax, twisted pair etc). Various modulation techniques like Orthogonal Frequency Division Multiplexing (OFDM), Wavelet modulations can be used. Forward error correction (FEC) code line Viterbi codes, Reed-Solomon codes, concatenated code, turbo codes, low density parity check code, etc., can be employed by the PHY to overcome errors.

Some implementations of the PHY layer use OFDM modulation. In OFDM modulation, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_i$ and $f_N$ referred to as the OFDM bandwidth.

Figure 2:
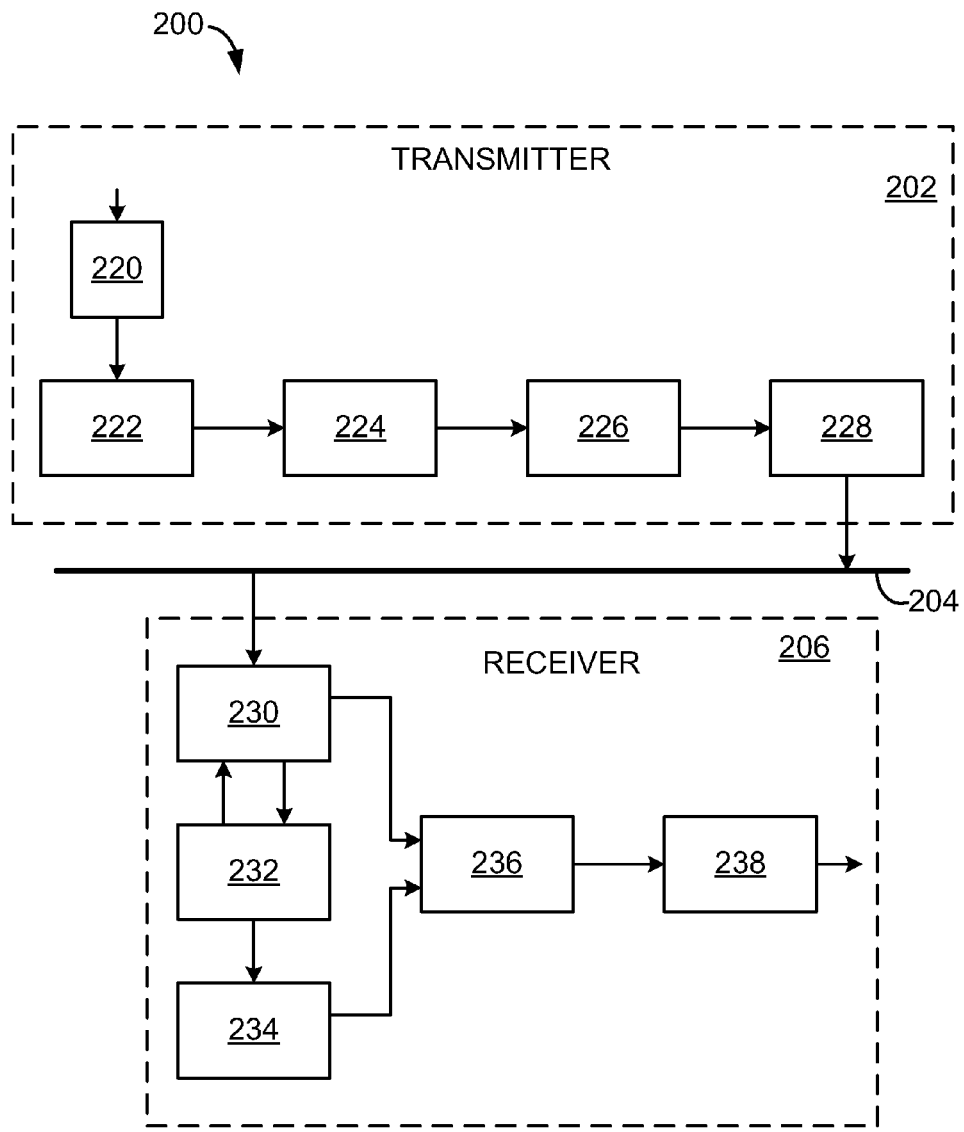
FIG. 2 is a block diagram of a communication system for communicating over the network.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the power line network.

At the transmitter 202, modules implementing the PHY layer receive an MPDU from the MAC layer. The MPDU is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i=A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 222 also determines which of the carrier frequencies $f_1, \ldots, f_N$ within the OFDM bandwidth are used by the system 200 to transmit information. For example, some carriers that are experiencing fades can be avoided, and no information is transmitted on those carriers. Instead, the mapping module 222 uses coherent BPSK modulated with a binary value from the Pseudo Noise (PN) sequence for that carrier. For some carriers (e.g., a carrier i=10) that correspond to restricted bands (e.g., an amateur radio band) on a medium 204 that may radiate power no energy is transmitted on those carriers (e.g., $A_{10}=0$). The mapping module 222 also determines the type of modulation to be used on each of the carriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused carriers) determined by the mapping module 222 onto N orthogonal carrier waveforms having peak frequencies $f_1, \ldots, f_N$. The modulated carriers are combined by IDFT module 224 to form a discrete time symbol waveform S(n) (for a sampling rate $f_R$), which can be written as $$S(n) = \sum_{i=1}^{N} A_i \exp[j(2\pi i n/N + \Phi_i)] \quad \text{Eq. (1)}$$

where the time index n goes from 1 to N, Ai is the amplitude and $\Phi_i$ is the phase of the carrier with peak frequency $f_i=(i/N)f_R$, and j=√−1 some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function g(τ;t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an MPDU for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including de-interleaving and descrambling).

Any of the modules of the communication system 200 including modules in the transmitter 202 or receiver 206 can be implemented in hardware, software, or a combination of hardware and software.

Home networking systems commonly use the phone lines, power lines or coaxial cables inside the house as a communication medium. In some cases, there could be variation in signal attenuation and noise characteristics between various pairs of nodes. In such cases, home network systems may use channel adaptation procedures that enable selection of unique physical layer encoding parameters (e.g., modulation rate and forward error correction code rate) between a given pair of nodes. This approach enables optimization of the physical data rate that can be achieved between the pair of nodes according to current channel characteristics.

In some implementations, the channel characteristics depend on an attenuation (and distortion) of the signal as it propagates from the transmission to the receiver. In other implementations, the channel characteristics may depend on noise within the network. The combined effect of signal attenuation (and distortion) and noise may determine the physical layer data rates that may be achieved between a pair of nodes. Higher physical data rates allow for more demanding and/or data intensive applications to be supported. The channel characteristics may also determine quality of a channel or how reliably information is transmitted across the channel. Indicators and measures of quality may include, for example, bit error rate (BER) or symbol error rate (SER). In general, a low quality channel is prone to distorting the messages it conveys while a high quality channel preserves the integrity of the messages it conveys. In some implementations, the quality of the channel in use between communicating entities governs the probability of the destination correctly receiving the message from the source.

Figure 3:
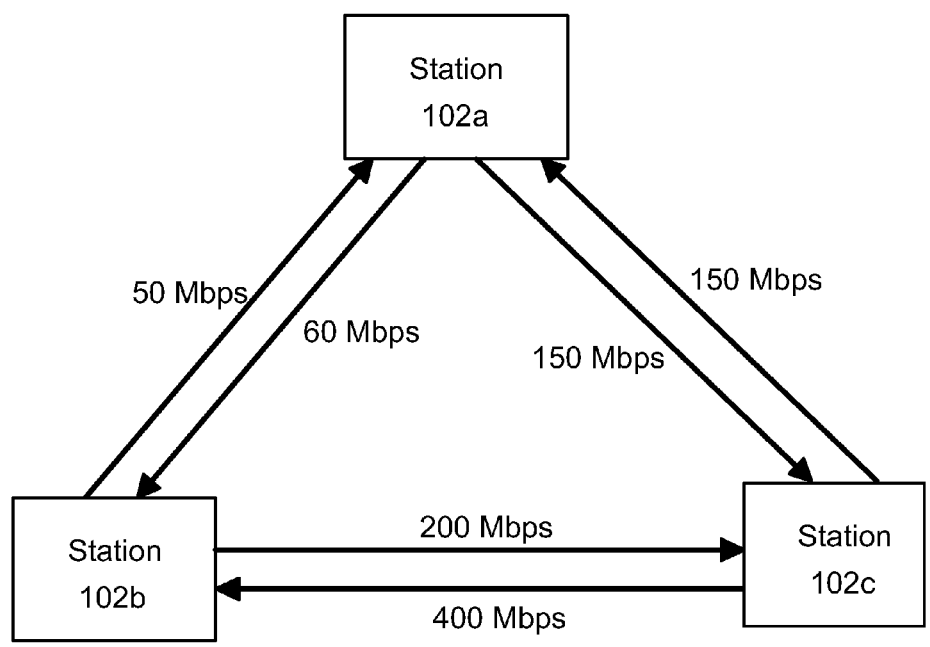
FIG. 3 is an example schematic diagram of three nodes with varying data rates between them.

Referring now to FIG. 3, an example with three nodes, station 102a, station 102b and station 102c, with varying data rates on channels corresponding to the paths between them are shown. For example, the data rate for a channel from station 102a to station 102b is 60 Mbps while the data rate for a channel from station 102b to station 102a is 50 Mbps. The data rate for channels in both directions between station 102a and station 102c is 150 Mbps. The data rate for a channel from station 102b to station 102c is 200 Mbps, while the data rate for a channel from station 102c to station 102b is 400 Mbps. Each node may act as a transmitter, a receiver or both. If channel adaptation is not used, in some cases the network may slow down to a data rate no greater than that of the slowest path (50 Mbps in this example for the path from station 102b to station 102a). In other cases, a universal data rate may be higher than the data rate achievable by some of the paths. In such cases, all the paths whose achievable data rate is less than the universal data rate will suffer losses (e.g., if the universal data rate is 100 Mbps, then communication between station 102a and station 102b will suffer loss of data packets). In some other cases, a path with an achievable rate higher than a universal data rate may also suffer from losses because parameters that allow it to realize that rate are not compatible with a set of universal parameters chosen for the network. Further, in some cases, all paths that are compatible with the universal parameters can only use only one data rate supported by the universal parameters (e.g., 100 Mbps), even though the channel could support a higher rate. In scenarios such as described above, channel adaptation offers a significant improvement in system performance.

In channel adaptation, a pair of nodes may determine and negotiate parameters that achieve communication at a rate dependent on the channel between them. Either node may act as a sender, a receiver or both. In some cases the sender and receiver may use the same parameters. In some cases, the receiver is unable to demodulate and decode transmissions if the sender and the receiver are not using the same parameters. Channel adaptation parameter sets are often very large. In some cases, these sets are given a shorter index once they are negotiated. Often, this index may be sent at the beginning of each transmission so that the receiver knows how to handle the rest of the transmission.

For example, in an OFDM system, the channel adaptation parameters can include modulation information for each carrier (like BPSK, QSPK, 8-PSK, 64 QAM etc.), the guard interval duration and the forward error correction code rates, forward correction block size etc. This large set of information can be associated with an index (that is recognized by the receiver) that is transmitted at the beginning of the transmission.

Home networking systems may use a variety of medium access control techniques to coordinate access to the medium. Examples of such techniques include polling, token ring, carrier sensed multiple access (CSMA), time division multiple access (TDMA), and other hybrid techniques.

Referring now to FIG. 4, a block diagram of a Physical Protocol Data Unit (PPDU) format is shown and described. The PPDU 405 is a physical layer signal that is transmitted on the communication medium. The PPDU 405 may include several parts or fields. For example, as shown in FIG. 4, the PPDU format that is used by home networking technologies (for example, HomePlug AV) includes a preamble 415, a PHY frame header 420, and a payload 425. The preamble 415 and the PHY frame header 430 may together be referred to as overhead information 430.

The preamble 415 may be used for functions such as adjustable gain controller (AGC), demarcation of the start of the packet, and physical symbol synchronization. The PHY frame header 420 includes header information 422 such as a source address, a destination address, channel adaptation information for the payload 425, duration of the payload 425 and header check sequence to determine the integrity of the header 420. The PHY frame header 420 may contain other information 422 including but not limited to status update on a sender, information to be transmitted to other nodes in a network and parameters related to an error correction technique. In some cases, the PHY frame header 420 is transmitted in a broadcast mode so that all stations or nodes can receive the header information 422 and react appropriately. Some of the header information 422 may be used by the receiver to interpret the payload 425. Other portions of the header information 422 may be used to provide status information to the receiver or to other nodes in the network. The payload 425 may contain application data or management information 427 that is exchanged between the transmitter and the receiver. In some cases, the payload 425 is modulated based on unique channel characteristics between the transmitter and the receiver. In such cases, it is unlikely that the payload 425 is properly received by nodes other than the intended destination(s). Consequently, in such cases, the payload 425 may not be suitable for communicating information to nodes other than the receiver.

The PPDU format described above can be used for all communications between stations. However, this PPDU format suffers from inefficiency when the header information 422 is transmitted in the broadcast mode. In some cases, the physical layer encoding is done such that even the furthest device, node or station in the network is capable of receiving the PHY frame header 420. Broadcast transmission rates are typically low, and so the PHY frame header 420 may take a long time to be transmitted. This results in a waste of time on the medium for each PPDU transmission, thus resulting in a lower efficiency.

This loss in efficiency can be significantly reduced when a receiving station knows which station is sending traffic. In such cases, the fields in the header information 422 that are relevant for decoding the payload 425 (and possibly other fields) can be pre-negotiated, while other header fields can be transmitted as a part of the PPDU payload 425. When one or more header fields of the header information 422 are transmitted as a part of the PPDU payload 425, the overhead due to the PHY frame header 420 transmission is minimal.

Referring now to FIG. 5, a block diagram of an optimized PPDU 505 in accordance with the approaches described herein is shown. In some implementations, the PHY frame header 520 may be reduced in duration. In other implementations, a part of the header information 422 may be included as a part of the payload 525. Several other variations on this approach may be employed. In some scenarios the entire PHY frame header 520 can be eliminated. In general, the preamble 415 and the PHY frame header 520 are collectively referred to as overhead information 530.

In some cases, fields of the header information 422 (or "header fields") are transmitted using the same physical layer encoding as the payload 525. In other cases, fields of the header information 422 are encoded in a manner so as to provide higher reliability of reception. This improvement in reliability of the header information 422 (relative to the payload 525) can be achieved in several ways. One approach is to repeat the header fields multiple times. Since multiple copies of the header fields are present, the receiver has a high probability of receiving the header fields even when one or more copies of the header fields get corrupted. Another approach is to encode the header fields with a robust error correction technique such as Forward Error Correction (FEC) technique. For example, a forward error correction mechanism using a lower code rate typically provides better protection against errors than forward error correction mechanisms using a higher code rate. Thus, the robustness of the header fields can be improved by using a lower code rate than that of the payload 525. The header reliability can also be increased by using a stronger forward error correction code than that used by the payload 525. The header fields may be modulated using relatively conservative parameters compared to other fields in the payload 525. For example, in some OFDM systems, the modulation for each carrier is determined based on the signal to noise ratio observed on that carrier. Thus, some carriers with very poor signal to noise ratio may not be transmitting any data while other carriers may choose modulations like BPSK, QPSK, 8-PSK, 16-QAM, 64-QAM, 256-QAM, 1024 QAM or any other modulation technique. The selection of the carrier modulations for header fields may be done conservatively compared to the payload 525. For example, the carrier modulation for header fields may be done such that the bits per carrier (bpc) are reduced by 2 bits for each carrier relative to the payload 525. Thus, carriers using 8-PSK, 16-QAM, 64-QAM, 256-QAM and 1024 QAM in the payload 525 are modulated using BPSK, QPSK, 16-QAM, 64-QAM and 256-QAM, respectively. In some implementations, other carriers are not used for transmitting the header information 422. In other implementations, some carriers within an OFDM signal may be used for encoding the header information 422 while other carriers within the same OFDM signal may be used for encoding a part of the payload 525. In some implementations, all carriers in OFDM symbols that contain at least a portion of the header fields, may use a conservative carrier modulation. This approach may reduce receiver complexity since all carriers within a symbol uses the same carrier modulation technique irrespective of whether the carrier is carrying header fields or payload information 525. It should be noted that in some implementations, a plurality of the above mentioned approaches may be combined to improve reliability of the header transmission. For example, in one implementation, an FEC technique may be used in conjunction with repeated header fields. In some implementations, the above techniques are used for one or more of unicast, multicast and broadcast transmissions or a combination thereof. The header information 422 generally contains different fields. These fields comprise information 422 related to one or more functionalities including interpretation of the payload 525 (e.g., modulation parameters, forward error correction parameters, duration); updating the receiver on the status of the sender; and communicating information to other stations. In some cases, some of the information 422 in the header need not be sent with every PPDU 505. In other cases, the receiver only needs to know how to interpret the payload 525. If the channel characteristics do not change over a given range of time, the sender and the receiver can negotiate and preload some of the information 422 when a communication is set up between the sender and the receiver. In some cases both the sender and the receiver know when to expect a transmission conforming to these prearranged parameters while other stations know not to transmit during these transmission times. In such cases, the entire PHY frame header 520 may become redundant and need not be sent.

In some cases, the sender and the receiver have preset parameters needed to interpret the payload 525 but the sender may communicate status information to the receiver. In such cases, the status information, which is commonly carried in the PHY frame header 520, may be sent as a part of the payload 525. Transmission parameters related to the payload 525 may be previously determined using one or more previous transmissions between the sender and receiver (or "pre-negotiated"). For example, transmission parameters can be optimized with respect to one or more characteristics of the communication channel between the sender and receiver estimated during channel adaptation. If the sender needs to communicate status information to nodes other than one or more receivers, the information may either be sent explicitly (via a dedicated transmission) or via a broadcast PHY frame header 520. However when such information is not sent with every transmission, methods and systems described herein can still be used.

In some cases, the status information, when sent as a part of the payload 525, may be sufficiently critical to be protected better than other portions of the payload 525. In other cases, the methods typically used in payloads may not be sufficient to provide such increased protection. In such cases, the header fields may be repeated or encoded using stronger forward error correction (FEC) methods than that used for the rest of the payload 525. In another approach, the modulation used for the physical symbols carrying the header fields is changed. The channel adaptation parameters for transmitting the fields from the header may be more conservative than those used for the rest of the payload 525. In some of these cases, the number of symbols using the conservative parameters is negotiated ahead of time between the sender and the receiver. It should be noted that transmission parameters between a sender and a receiver is chosen based on characteristics of the channel between them. If channel characteristics are such that the header fields cannot be received reliably and/or sufficiently regularly, the sender and the receiver can elect not to use any of the approaches described above. It should also be noted that the approaches mentioned above are purely for illustrative purposes and should not be considered limiting in any sense. In practice, these approaches may be suitably modified depending on the channel characteristics without deviating from the spirit or scope of the present application.

Communication of header information 422 may be optimized even when the transmission is intended for multiple receivers (broadcast or multicast communications), and has been adapted to the channel characteristics of a specific network. As long as receivers know how to demodulate and decode a payload 525, one or more header fields of the header information 422 may be included in the payload 525, allowing a sender to send an update to all the receivers.

In some cases, it could be possible to improve the broadcast or multicast communication rates in a specific system, in comparison to default broadcast modulation and FEC methods, by using knowledge about the specific system. Default modulation and FEC are usually set with the worst case scenario in mind, making the default very conservative. When the physical characteristics of an actual network are such that the lowest rate between a pair of nodes is higher than the default rate, then it may be possible to determine modulation and FEC parameters specific to that network that enable faster (hence more efficient) broadcast or multicast transmissions.

In some cases, optimization of multicast transmissions can be based on the worst case scenario for any pair of nodes in the network. In such cases, all senders use the same parameters to transmit payloads. In these cases, the receivers do not need to know the identity of a sender to receive a payload. The receiver may receive the transmissions successfully only by knowing that a transmission is occurring. Alternatively, if the sender is always known ahead of time, then the multicast transmission can be optimized for each sender. This may produce higher rates for some nodes than for others. When only one set of parameters is used, it all senders should be able to conform to the set of parameters. Therefore, such cases will generally achieve a lower rate than that when the parameters are optimized for each sender individually.

Further improvement may be possible if the receiver sets are taken into account. If a node has multicast transmissions to two (possibly overlapping) sets of nodes, the rates that may be achieved using parameters optimized to each set will generally be higher than the rate that may be achieved using parameters that work for both sets of receivers. The improvement may be more pronounced as compared to broadcast, when the multicast receiver sets are small.

One way to determine the physical layer encoding for multicast or broadcast transmissions is to use the channel characteristics information between the transmitter and each of the receivers in a group and derive physical layer encoding parameters that enable all receivers to properly receive the transmissions. For example, in some OFDM systems, each receiver can provide the transmitter with information such as a signal to noise ratio for each carrier and delay spread (or guard interval required). The transmitter can process this information from all receivers in the group and derive a physical layer encoding suitable for the multicast or broadcast transmissions. Another approach is to use parameter sets obtained for unicast transmissions between each transmitter and receiver in the group and derive multicast or broadcast parameter sets from the unicast parameter set. For example, the modulation on each carrier for the multicast or broadcast transmissions can be selected to satisfy a minimum requirement for that carrier between the transmitter and all the receivers in that group. Similarly, a guard interval for the multicast or broadcast transmissions can be selected to be the maximum of a required guard interval for transmissions from the transmitter to any receiver in the group. It should be understood that these examples are provided for illustrative purposes and should not be considered limiting in any sense. Other approaches including optimizing multicast communications bit loading are also possible.

In some implementations, the header fields may contain information to be received not only by the intended destination(s) of the transmission, but also by a master node within the network. For example, the transmitter may want to communicate information related to bandwidth requirement to the master node using the header fields. In such cases, the physical layer encoding mechanism for the header information 422 can take into account the channel characteristics between the transmitter and the receiver(s) and also the channel characteristics from the transmitter to the master. The transmitter, the master and the receiver(s) negotiate the physical layer encoding mechanism for the header thus ensuring that the receiver(s) and the master can properly receive the header information 422. The transmission parameters, including the physical layer encoding mechanism, may be decided by the transmitter, the master or any of the receivers, either individually or in cooperation with each other. In some implementations, transmission parameters for the payload 525 is adapted according to channel characteristics between the transmitter and the intended recipients while transmission parameters for at least a part of the overhead information is adapted for some nodes or stations other than the intended recipients.

Any type of modulation technique may be used for modulating one or more of the payload 525 and the overhead information 530. In some implementations, analog modulation techniques such as amplitude modulation (AM), frequency modulation (FM) or phase modulation (PM) may be used. In other implementations, one or more digital modulation techniques may also be employed. Examples of such modulation techniques include, without limitation, phase shift keying (PSK), frequency shift keying (FSK), amplitude shift keying (ASK) and quadrature amplitude modulation (QAM). In QAM, an in-phase signal and a quadrature-phase signal are amplitude modulated and combined. The number of symbols in a QAM scheme may be decided based on design parameters and/or one or more estimated characteristics of a channel. In some implementations, a combination of a plurality of modulation schemes may also be used. For example, in one implementation, a part of the overhead information 530 may be modulated using 16-QAM while another part of the overhead information 530 is modulated using 256-QAM. In some implementations, the payload 525 and the overhead information 530 may be encoded using different modulation techniques. For example, the payload 525 may be modulated using a less robust technique such as 256-QAM while one or more parts of the overhead information 530 are encoded using a more robust modulation scheme such as 16-QAM or even BPSK. In some implementations, each part of a transmission that has a different set of transmission parameters require a separate error correction technique associated with it.

While various implementations have been illustrated and described in the present application, it is not intended that these implementations illustrate and describe all possible forms of the invention. Rather, the words used in the specification are words of description rather than limitation, and it is understood that various changes may be made without departing from the spirit and scope of the invention. Many other implementations of the invention other than those described above are within the invention, which is defined by the following claims.

What is claimed is:

1. A method, comprising:
preparing, at a transmitting station, a physical protocol data unit for transmission over a network to one or more receiving stations, the physical protocol data unit including at least overhead information and a payload, the overhead information being associated with encoding or modulation information regarding the payload or with a communication protocol used by stations in the network;
determining whether at least some of the overhead information is intended for stations other than the one or more receiving stations; modulating the overhead information based on whether at least some of the overhead information is intended for stations other than the one or more receiving stations; and
modulating the payload, wherein at least a part of the overhead information and the payload are modulated according to different modulation parameters.

2. The method of claim 1, wherein modulating the overhead information includes modulating the overhead information according to at least one common channel characteristic of communication channels between the transmitting station and each of the one or more receiving stations.

3. The method of claim 2 further comprising determining at least one common channel characteristic of communication channels between the transmitting station and each of the one or more receiving stations.

4. The method of claim 1, wherein the overhead information is received by at least one station that does not receive the payload.

5. The method of claim 4, wherein the at least one station that does not receive the payload includes a station that manages a plurality of stations on the network.

6. The method of claim 4, wherein modulating the overhead information includes modulating the overhead information according to at least one common channel characteristic of communication channels between the transmitting station and each of the one or more receiving stations and the at least one station that does not receive the payload.

7. The method of claim 1, wherein modulating the overhead information includes:
modulating the overhead information according to at least one estimated channel characteristic of a communication channel if none of the overhead information is intended for stations other than the one or more receiving stations, and
modulating the overhead information for broadcast to stations other than the one or more receiving stations if at least some of the overhead information is intended for stations other than the one or more receiving stations.

8. The method of claim 1, wherein preparing the physical protocol data unit includes appending a header including the overhead information to the payload within the physical protocol data unit.

9. The method of claim 1, wherein modulating the payload includes modulating the payload according to at least one estimated channel characteristic of a communication channel between the transmitting station and at least one of the one or more receiving stations.

10. The method of claim 9, wherein at least one estimated channel characteristic of the communication channel used to modulate the payload is different from another estimated channel characteristic of the communication channel used to modulate the overhead information.

11. The method of claim 10, wherein a first modulation parameter based on the at least one estimated channel characteristic of the communication channel used to modulate the payload is less conservative than a second modulation parameter based on the another estimated channel characteristic of the communication channel used to modulate the overhead information.

12. The method of claim 1, wherein the overhead information comprises the encoding or modulation information regarding the payload, the encoding or modulation information including on one or more of a modulation technique, a modulation rate, duration of one or more parts of the transmission and an error correction method.

13. The method of claim 1, wherein the overhead information comprises status update information about a station in the network.

14. The method of claim 1, further comprising transmitting a preamble field of the physical protocol data unit.

15. The method of claim 1, further comprising negotiating one or more transmission parameters between the transmitting station and the one or more receiving stations before the physical protocol data unit is transmitted.

16. The method of claim 15, wherein the transmission parameters are based on at least one estimated channel characteristic of a communication channel between the transmitting station and at least one of the receiving stations.

17. A transmitting station for communicating with other stations in a network, the transmitting station comprising:
at least one transmitter module configured to
prepare a physical protocol data unit for transmission over a network to one or more receiving stations, the physical protocol data unit including at least overhead information and a payload, the overhead information being associated with encoding or modulation information regarding the payload or with a communication protocol used by stations in the network,
determine whether at least some of the overhead information is intended for stations other than the one or more receiving stations,
modulate the overhead information based on whether the overhead information is intended for stations other than the one or more receiving stations, and
modulate the payload, wherein at least a part of the overhead information and the payload are modulated according to different modulation parameters.

18. The transmitting station of claim 17 wherein the transmitter module is configured to modulate the payload according to at least one estimated channel characteristic of a communication channel between the transmitting station and at least one of the receiving stations.

19. The transmitting station of claim 18 wherein the transmitter module is configured to modulate the overhead information according to at least one estimated channel characteristic of the communication channel if none of the overhead information is intended for stations other than the one or more receiving stations.

20. The transmitting station of claim 19 wherein the transmitter module is further configured to modulate the overhead information for broadcast to stations other than the one or more receiving stations if at least some of the overhead information is intended for stations other than the one or more receiving stations.

21. The transmitting station of claim 17 wherein the transmitter module is further configured to append a header comprising the overhead information to the payload within the physical protocol data unit.

22. The transmitting station of claim 20 wherein the transmitter module is further configured to modulate at least a part of the overhead information and the payload according to at least one estimated channel characteristic of a communication channel between the transmitting station and at least one of the one or more receiving stations.

23. The transmitting station of claim 17 wherein the overhead information comprises the encoding or modulation information regarding the payload, the encoding or modulation information including one or more of a modulation technique, a modulation rate, duration of one or more parts of the transmission and an error correction method.

24. The transmitting station of claim 17 wherein the overhead information comprises status update information about a station in the network.

25. The transmitting station of claim 21 wherein the transmitter module is further configured to transmit a preamble field of the physical protocol data unit.

26. The transmitting station of claim 17, wherein the transmitter module is configured to modulate the overhead information according to at least one common channel characteristic of communication channels between the transmitting station and each of the one or more receiving stations.

27. The transmitting station of claim 26 wherein the transmitter module is configured to determine at least one common channel characteristic of communication channels between the transmitting station and each of the one or more receiving stations.

28. The transmitting station of claim 17, wherein the overhead information is modulated such that the overhead information may be received by at least one station that does not receive the payload.

29. The transmitting station of claim 28, wherein the at least one station that does not receive the payload includes a station that manages a plurality of stations on the network.

30. The transmitting station of claim 28, wherein the transmitter module is configured to modulate the overhead information according to at least one common channel characteristic of communication channels between the transmitting station and each of the one or more receiving stations and the at least one station that does not receive the payload.

31. The transmitting station of claim 18, wherein at least one estimated channel characteristic of the communication channel used to modulate the payload is different from another estimated channel characteristic of the communication channel used to modulate the overhead information.

32. The transmitting station of claim 17, wherein the transmitter module is configured to negotiate one or more transmission parameters between the transmitting station and the one or more receiving stations before the transmission is transmitted.

33. The transmitting station of claim 32, wherein the transmission parameters are based on at least one estimated channel characteristic of a communication channel between the transmitting station and at least one of the one or more receiving stations.

34. The transmitting station of claim 33, wherein a first modulation parameter based on the at least one estimated channel characteristic of the communication channel used to modulate the payload is less conservative than a second modulation parameter based on another estimated channel characteristic of the communication channel used to modulate the overhead information.

35. A method of transmitting a physical protocol data unit from a transmitting station to a receiving station, the physical protocol data unit comprising overhead information and payload, the method comprising:
modulating at least a first portion of the overhead information of the physical protocol data unit in accordance with at least a first set of modulation parameters, wherein the first portion of the overhead information is intended for the receiving station and for stations other than the receiving station; and
modulating a second portion of the overhead information of the physical protocol data unit in accordance with at least a second set of modulation parameters different from the first set of modulation parameters, wherein at least one of the first set of modulation parameters and the second set of modulation parameters are determined using one or more previous transmissions between the transmitting station and the receiving station.

36. The method of claim 35, wherein at least one of the first set of modulation parameters and the second set of modulation parameters are negotiated between the transmitting station and the receiving station in accordance with one or more estimated channel characteristics of a communication channel between the transmitting station and the receiving station.

37. The method of claim 35 further comprising transmitting the payload in accordance with a third set of modulation parameters negotiated between the transmitting station and the receiving station in accordance with one or more estimated channel characteristics of a communication channel between the transmitting station and the receiving station.

38. The method of claim 37 wherein at least one parameter in the first set of modulation parameters or the second set of modulation parameters is same as a parameter in the third set of modulation parameters.

39. The method of claim 35 further comprising transmitting at least a portion of the physical protocol data unit in a broadcast mode.

40. The method of claim 35, wherein the first portion of the overhead information includes a preamble and a first portion of header information, and the second portion of the overhead information includes a second portion of the header information.

41. The method of claim 1, wherein the modulation parameters include a modulation rate for each carrier used in an orthogonal frequency division multiplexing (OFDM) symbol.

42. The transmitting station of claim 18, wherein the modulation parameters include a modulation rate for each carrier used in an orthogonal frequency division multiplexing (OFDM) symbol.

* * * * *